United States Patent Office 3,309,298
Patented Mar. 14, 1967

3,309,298
PREPARATION OF HYDROCHLORIDE SALTS OF CYCLOALKANONE OXIMES
Yoshikazu Ito, Mizuho-ku, Seiichi Torimitsu, Minato-ku, and Yoichi Shimokawa, Fumio Nishikawa, and Yoichiro Hara, Minami-ku, Nagoya, Japan, assignors to Toyo Rayon Kabushiki Kaisha, Tokyo, Japan, a corporation of Japan
Filed Jan. 8, 1963, Ser. No. 250,133
Claims priority, application Japan, Jan. 12, 1962, 37/1,179; Jan. 30, 1962, 37/2,574; June 8, 1962, 37/23,168
7 Claims. (Cl. 204—162)

This invention relates to a method of preparing the hydrochloride salts of cycloalkanone oximes. More particularly, the invention relates to a method of preparing the hydrochloride salts of cycloalkanone oximes in which in the preparation thereof comprising nitrosating cycloalkanes with a nitrosation agent while irradiating with light in the presence of hydrogen chloride to thereby obtain the corresponding hydrochloride salts of cycloalkanone oximes, as said light, light not containing wave lengths shorter than 350 m$\mu$, preferably not shorter than 400 m$\mu$, is used.

In the past, the method comprising nitrosating cycloalkanes with a nitrosating agent while irradiating with light in the presence of hydrogen chloride to thereby prepare the corresponding hydrochloride salts of cycloalkanone oximes was known, being also termed as the photonitrosation reaction of cycloalkanes. The light source generally employed in this instance include sunlight, mercury-vapor lamp and xenon lamp, the foregoing photonitrosation reaction being usually carried out either by immersing the light source in the reaction liquid or by directing the irradiation into the reaction vessel from the outside of the reaction vessel with a transparent wall intervening.

However, according to the conventional method, there were numerous shortcomings which could not be avoided, namely:

(a) Concomitantly as the photonitrosation reaction proceeds, a viscous, yellow to brown coating of a tar-like substance would form on the light transmitting wall in contact with the reaction liquid and result in a decrease in the rate of transmission of the light. Consequently, for raising the rate of utilization of the light, it becomes necessary to interrupt the reaction after a certain number of hours and remove the this foul matter adhering to the light transmitting part.

(b) Not only a viscous, yellow to brown coating of tar-like substance is formed on the light transmitting wall in contact with the reaction liquid, but also all sorts of side reactions are induced. As a result, various undesirable by-products are formed, such, for example, as chloronitrosocycloalkane, chlorocycloalkanone oxime and chlorocycloalkane, and thus the purity of the intended hydrochloride salts of cycloalkanone oximes is lowered.

(c) In concomitance with the phenomena described in (a) and (b), above, it naturally follows that not only does the yield of the intended hydrochloride salts of cycloalkanone oximes fall, but also the reaction operations becomes complicated. In addition, due to the admixture of impurities, a consideragle amount of expense is required for the purification of the lactams derived from the hydrochloride salts of cycloalkanone oximes.

Accordingly, for eliminating the shortcomings, as described hereinabove, many proposals have been made hitherto such as:

(1) A method of adding hydrogen chloride in excess into the reaction zone of the photonitrosation reaction; and (2) A method of adding similarly into said reaction zone an organic acid such as acetic acid or trichloroacetic acid.

However, while it was possible to raise the yield of the hydrochloride salts of cycloalkanone oxime to a certain extent by employing the method described in (1) above, in which is used hydrogen chloride in excess, it was not possible to prevent completely the formation of a yellow to brown tar-like substance which forms on the aforesaid light transmitting wall and hence the problem of preventing the admixture of impurities in the hydrochloride salts of cycloalkanone oximes formed could not be solved. Again, it was not possible to prevent completely the formation of the tar-like substance, which adheres to the light transmitting wall, by the method described in (2) above, either. Moreover, there was the defect that by this method the admixture of impurities in the product would increase rather.

Accordingly, a primary object of the invention is to provide a method of preparing the hydrochloride salts of cycloalkanone oximes by means of a stable photonitrosation reaction which does not form a tar-like substance on the light transmitting wall in contact with the reaction liquid.

Another object of the invention is to provide a method of preparing in high purity and high yield the hydrochloride salts of cycloalkanone oximes by means of the photonitrosation reaction by restraining the setting up of side reactions.

Other objects and advantages of this invention will become apparent from the description which follows.

Figure 1:
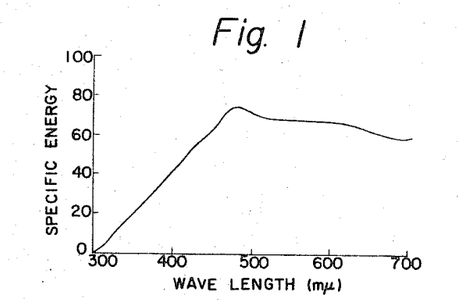
Figure 2:
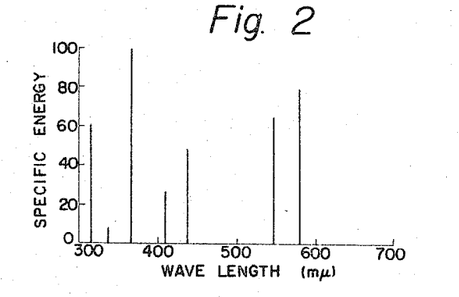
Figure 3:
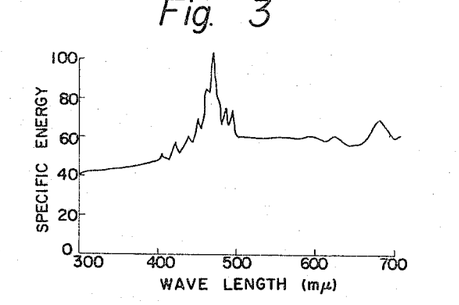

Heretofore, the light of the light sources employed in the photonitrosation reaction, i.e., the sun's rays, the mercury-vapor lamp rays and the xenon lamp rays, as indicated by their respective spectra shown in FIGS. 1, 2 and 3, consisted of composite rays of diverse wave lengths ranging from rays of relatively short wave length of less than 350 m$\mu$ to rays of relatively long wave length of more than 400 m$\mu$.

When we assiduously researched into the relationship existing between the formation of the aforesaid tar-like substance which adheres to the light transmitting part with which the reaction liquid makes contact in the photonitrosation reaction of cycloalkanes and the wave lengths of the light used in this instance, it was discovered that light of wave lengths shorter than 350 m$\mu$ became substantially the cause for bringing about the formation of said tar-like substance and further that light having wave lengths between 350 m$\mu$ and 400 m$\mu$ also became the cause for the formation of the tar-like substance in an amount as could not be ignored. Hence, on the basis of this discovery, when, by a method to be described in detail hereinafter, the nitrosation (also referred to as photonitrosation) of cycloalkanes was carried out by means of a nitrosating agent in the presence of hydrogen chloride in accordance with conventional technique while irradiating with light not having a wave length shorter than 350 m$\mu$, preferably not shorter than 400 m$\mu$, by absorbing and excluding light having these wave lengths by means of a suitable absorption zone, it was found that hydrochloride salts of cycloalkanone oximes of very high purity could be prepared by carrying on the photonitrosation reaction stably without any tar-like substance adhering to the light transmitting wall in contact with the reaction liquid as well as preventing the occurrence of undesirable side reactions.

In the past, it has been known from the disclosures of German Patent 1,064,946 that light having wave lengths shorter than 250 m$\mu$ would induce the formation of by-products in the photonitrosation reaction of cycloalkanes. On the other hand, U.S. Patent 2,885,332 and British Patent 789,732 disclose that light having lengths of 350–

700 mμ and 300–600 mμ are preferred in this photonitrosation reaction.

In accordance with this information, in the past, the attempts made were for producing a light containing as great an amount as possible of wave lengths or the order of 300–600 mμ. For instance, in the early stages of researches concerning the photonitrosation of cycloalkanes, sunlight and light from low and high pressure mercury-vapor lamps were employed. However, with the development of researches, as described hereinabove, the industrial use of sunlight was gradually discontinued and instead attempts were made to produce light containing as great an amount as possible of light whose wave lengths were on the order of 300–600 mμ by regulating the vapor pressure of the mercury in the mercury-vapor lamp and to utilize this in the photonitrosation reaction. One of us also having discovered back in 1953 that light having wave lengths of 365–600 mμ was desirable as light to be used in photonitrosation, reported as to the desirability of a high pressure mercury-vapor lamp as a light source for emitting light containing as great an amount as possible of light of such wave lengths.

However, no matter how the vapor pressure of the mercury in a mercury-vapor lamp is regulated and similarly no matter how the vapor pressure of the xenon contained in a xenon lamp is regulated, these contain a considerable amount as could not be ignored of light having wave lengths shorter than 350 mμ, and thus it is impossible to produce light which contains substantially no wave lengths shorter than 350 mμ. And it was also found in this invention that even though light having wave lengths shorter than 350 mμ is contained in a slight amount in the irradiating rays used in the photonitrosation reaction when carrying out said reaction, it would become the cause of the adhesion of a tar-like substance to the light transmitting wall in contact with the reaction liquid as well as bringing on other side reactions.

According to our studies, even though the light is of wave lengths shorter than 350 mμ, to merely effect the photonitrosation of cycloalkanes and the oximation thereof is in general possible. Therefore, the reason that heretofore light of wave lengths of 365–600 mμ or 300–600 mμ was regarded as desirable in the photonitrosation reaction of cycloalkanes, as described hereinbefore, was because studies were made only regarding the relationship between the photonitrosation reaction of cycloalkanes and the wave lengths of the rays and no studies were made concerning the relationship between the wave lengths of the irradiating light and the side reactions of the photonitrosation reaction, as described in (a) and (b), above.

However, in the present invention, as a result of studies made regarding light having wave lengths shorter than 350 mμ, and in particular regarding the relationship existing between the wave lengths of the irradiating light and these side reactions in the photonitrosation reaction, we found that light having wave lengths shorter than 400 mμ must be positively eliminated and that light containing substantially no light of such wave lengths must be employed as the light for irradiating the reaction liquid in the photonitrosation reaction.

As already shown in FIGS. 1–3, that the heretofore industrially proposed light sources contain wave lengths shorter than 350 mμ, that further it is not possible to obtain by means of such light sources light that does not contain substantially light having wave lengths shorter than 350 mμ, preferably shorter than 400 mμ, and that in spite of the fact that the photonitrosation reaction can even be carried out by means of light of wave lengths shorter than 350 mμ, preferably shorter than 400 mμ, when, on the other hand, an irradiating light which substantially did not contain at all such wave lengths was employed, that the photonitrosation reaction could be carried out stably and in exceedingly high yield as compared with the instance in which an irradiating light containing the foregoing wave lengths was employed are surprising facts. The foregoing is ever so much more effectively manifested by positively excluding the wave lengths shorter than 400 mμ, which means the exclusion substantially of even the wave length of 365 mμ which was hitherto considered desirable.

The advantages of this invention will be made known by giving the results of an experiment we performed. The experiment was performed to ascertain the formation of tar-like substance, the purity of the hydrochloride salt of cycloalkanone oxime obtained and its yield in each of the instances of:

(1) When the irradiating light contained wave lengths shorter than 350 mμ as in the conventional methods; (2) when, in accordance with the present invention, light of wave lengths shorter than 350 mμ was not contained; and (3) when light of wave lengths shorter than 400 mμ were not contained, a condition particularly preferred by this invention.

Employing the same apparatus and procedures as in the hereinafter given Example 8, the reaction was carried out while employing as the light absorption zone that comprising the cooling water for the light source, to which had been added the various kinds of fluorescent substances as enumerated below, namely:

Fluorescent substance:                 Amount added, g./l.
(a) Aqueous solution of a fluorescent brightening agent Whitex RP (produced by Sumitomo Kagaku Kogyo K. K.) ____________________ 0.5
(b) Aqueous solution of sodium salt of β-naphthol ________________________________ 5
(c) β-naphthol solution (water:ethanol=4:1) ___ 2
(d) Aqueous solution of α-naphthalenesulfonic acid ____________________________________ 2

Figure 4:
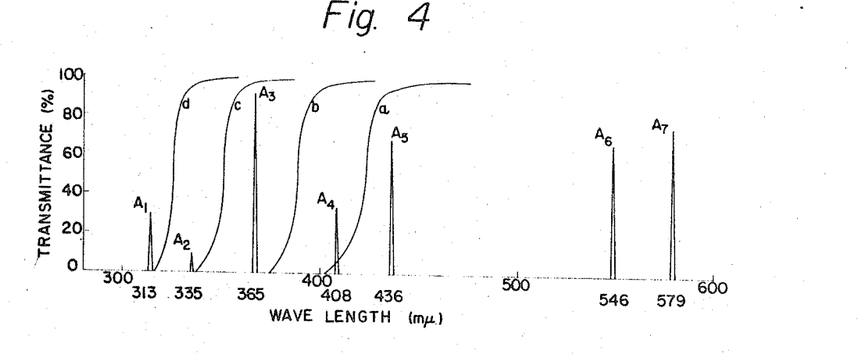

The spectra $A_1$–$A_7$ in this instance of a high pressure mercury-vapor lamp (having a cooling water layer not containing a fluorescent substance) and the transmittance of the light absorption zone containing the foregoing fluorescent substances (a)–(d) are shown in FIG. 4. In the figure $a$ represents the transmittance of the light absorption zone comprising the cooling water to which had been added the fluorescent substance (a) in the above-listed amount, $b$, of that of (b), $c$, of that of (c), and $d$, of that of (d), respectively. In Table I, below, are shown the results as to the yield of the hydrochloride salts of cycloalkanone oximes and the formation of a tar-like substance, respectively, in the case no additions were made of fluorescent substances and the case when the fluorescent substances (a)–(d) were added.

TABLE I

| Type of Liquor Filter | Yield of Hydrochloride Salt of Cycloalkanone Oxime (g.) | Formation of Tar-Like Substance on Light Transmitting Wall (g.) |
| --- | --- | --- |
| $a$ | 92.0 | None |
| $b$ | 90.8 | None |
| $c$ | 86.9 | 1.5 |
| $d$ | 79.1 | 3.4 |
| None (water only) | 78.0 | 5.1 |

As shown by the results given in FIG. 4 and Table I, above, by light having the wave lengths of the ultraviolet portion, particularly those having the wave lengths of 313 mμ and/or 335 mμ, the wave lengths shorter than 350 mμ (d or c), which were hitherto considered desirable, and the light from the light source having only the cooling water, the formation of a tar-like substance could not be avoided. Furthermore, it can be seen that the yield of the hydrochloride salts of cycloalkanone oximes also decreases. These tendencies moreover are increasingly aggravated as the reaction is continuously prolonged. In contrast, in the case of light containing substantially no wave lengths shorter than 400 mμ ($A_1$, $A_2$, $A_3$) (lights a and b), substantially no formation of a tar-like substance could be observed. Thus it can be seen that despite the fact that a part of the wave lengths of that portion considered to be heretofore desirable had been positively removed, the yield, on the contary, increased. Further although by the light of a wave length of 365 m$\mu$ (c), which does not contain wave lengths of 313 m$\mu$ and/or 335 m$\mu$, wave lengths shorter than 350 m$\mu$, the formation substantially of a tar-like substance cannot be avoided, it can be seen that the extent of its adverse effect is relatively small as compared with the light containing wave lengths shorter than 350 m$\mu$ when the largeness of its energy is considered. However, it preferably should be eliminated. This point will be explained further with reference to FIG. 5 and Table II.

TABLE II.—RESULTS OF EFFECTIVENESS AND QUANTUM YIELD MEASUREMENTS

| Wave Length (m$\mu$) | Effectiveness in Photonitrosation Reaction (Oxime g./wh.) | Quantum Yield |
| --- | --- | --- |
| 365 | 0.87 | 0.70 |
| 400 | 0.94 | 0.69 |
| 440 | 0.97 | 0.65 |
| 480 | 1.15 | 0.69 |
| 520 | 1.26 | 0.71 |
| 560 | 1.47 | 0.76 |

Figure 5:
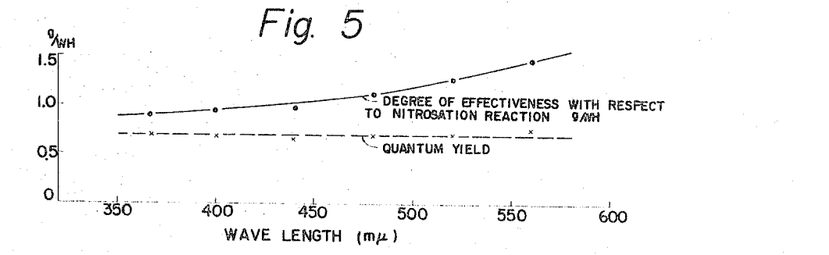

FIG. 5 and Table II which corresponds thereto show the effectiveness of the wave length with respect to the photonitrosation reaction of cyclohexane as well as the results of measurements made of the quantum yield in the case a xenon lamp was employed as the light source. In the figure, the curve $m$ represents the effectiveness (g./wh.) with respect to the nitrosation reaction and curve $n$, the quantum yield. As is apparent from FIG. 5 and Table II, light of a wave length of 365 m$\mu$ is fairly effective in forming the intended oximes. However, as the results of Table I, above, and FIG. 4 have shown, the formation of a tar-like substance in an amount that cannot be ignored cannot be avoided completely.

As the foregoing results indicate, light of wave lengths shorter than 350 m$\mu$ is very deleterious as it accelerates greatly the formation of a tar-like substance. On the other hand, while light of wave lengths between 350 m$\mu$ and 400 m$\mu$ are fairly effective with respect to the photonitrosation reaction, that they are deleterious in that they accelerate the formation of a tar-like substance cannot be avoided essentially. Therefore, according to the method of this invention, it is preferred to employ light which does not contain wave lengths shorter than 400 m$\mu$.

Figure 6:
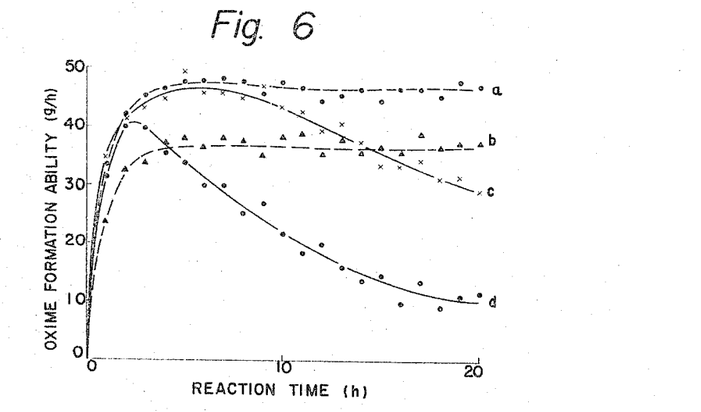
Figure 7:
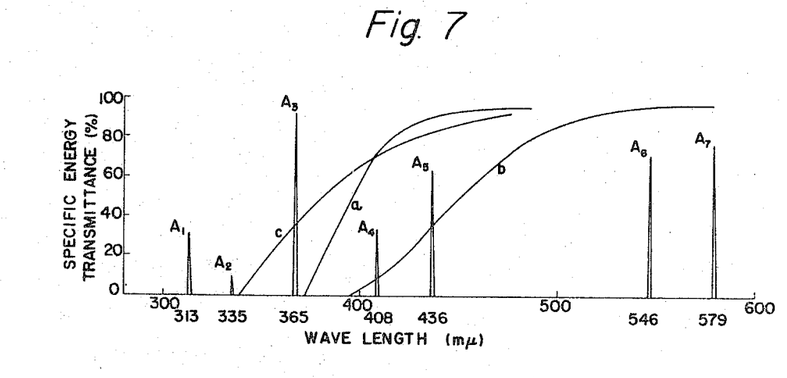

Next, in FIG. 6 will be given the results of experiments in which three types of ultraviolet ray filter glass were employed in a similar manner as in Example 18 and comparisons were made with the instances in which the ultraviolet rays were not absorbed. In this case, the distributions of the light energy transmitted to the reaction system ($A_1$–$A_7$) when an ordinary hard glass which does not particularly absorb ultraviolet rays was used as the cooling tube of the light source and the transmittances under the conditions of the employment of ultraviolet ray filter glass (a–c) are shown in FIG. 7. In FIG. 6, $a$, $b$ and $c$ are the curves of those cases in which the ultraviolet ray filter glass having the transmittances of $a$, $b$ and $c$, respectively, of FIG. 7 were used, while $d$ is that in which an ordinary hard glass was used and which encompasses the wave lengths $A_1$–$A_7$.

As is apparent from FIGS. 6 and 7, when light containing the wave lengths 313 m$\mu$, 335 m$\mu$ and 365 m$\mu$, which are shorter than 400 m$\mu$ (d), are used, soon after the start of the reaction a tar-like substance separated out onto the transmitting portion of the cooling jacket for the light source to thereby hinder the transmission of the light. And despite the fact that these ultraviolet rays are effective in promoting the nitrosation reaction, as compared to when they were eliminated and the formation of the tar-like substance was prevented, the productivity was low. Furthermore, since the tar-like substance gradually accumulates, with the passage of time the productivity falls off extremely so as to render utterly impossible the carrying out of a stable nitrosation reaction. On the other hand, as shown by the curves $a$ and $b$, when the ultraviolet rays shorter than 400 m$\mu$, which are emitted from the mercury-vapor lamp are fully eliminated, the formation of the tar-like substance can be checked almost completely. Thus it can be seen that the reaction can be carried out stably without any changes occurring with the passage of time and moreover in markedly high yield. In the case of curve $c$ which was that of the instance of the use of light having a wave length of 365 m$\mu$, a wave length falling in between 350 m$\mu$ and 400 m$\mu$, although it shows a considerable improvement over the light containing wave lengths shorter than 350 m$\mu$, which is shown as curve $d$ in FIG. 6, the formation substantially of a tar-like substance cannot be avoided and with the passage of time a declining tendency as in curve $d$ is shown. Hence, it can be seen that it is unsuitable for a reaction of extended period.

Figure 8:
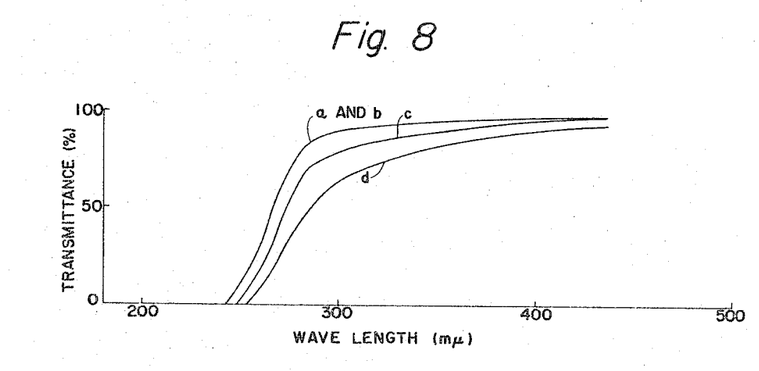

Further, when the ultraviolet ray filter glass of the same transmittance as shown in the aforementioned FIG. 7 (those represented by curves $a$, $b$ and $c$) and the light containing wave lengths $A_1$–$A_7$, as shown also in FIG. 7, were used and an experiment was carried out employing the same apparatus and techniques as in Example 18, the results obtained with respect to the purity of oximes formed were as shown in FIG. 8 and the corresponding Table III.

TABLE III.—QUALITY OF THE FORMED OXIMES

| Glass used: | Transmittance of 280 m$\mu$, percent |
| --- | --- |
| Ordinary hard glass | 41 |
| Absorption glass $a$ | 90 |
| Absorption glass $b$ | 90 |
| Absorption glass $c$ | 65 |

The quality of the formed oximes is determined in the following manner: The hydrochloride salt of oxime which is formed 10–11 hours after the start of the reaction is in its aqueous solution state, neutralized to a pH of 5.4 using caustic soda. After separation and drying of the cyclohexanone oxime, it is dissolved in methanol. The transmittance of light having a wave length of 280 m$\mu$ with respect to the methanol solution whose concentration of oxime has been made 1% represents the quality of the oxime. The higher the transmittance, the better the quality is of the oxime formed and the higher is it purity. As is apparent from the results shown in Table III and FIG. 8, according to the method of the present invention, not only can the formation of the tar-like substance be positively avoided, but also the formation of undesirable by-products can be prevented. Therefore, it can be seen that the yield of the intended hydrochloride salts of cycloalkanone oximes can be enhanced. Investigation into the other cycloalkanes besides the cyclohexane referred to in the foregoing description, such as cyclopentane, cyclooctane, cyclododecane, etc. gave the same results.

The fact that by also excluding positively the light having a wave length of 365 m$\mu$ which was hitherto regarded as being a desirable as well as useful wave length in the photonitrosation reaction it becomes possible to carry out a stabilized photonitrosation reaction with regularity and in which high yields are obtained is a particularly distinctive feature of this invention. According to the method of this invention, light having wave lengths shorter than 350 m$\mu$, which was heretofore regarded as being useful or desirable in the photonitrosation reaction, and more preferably light having wave lengths shorter than 400 m$\mu$ must be positively removed, and light containing substantially none of these wave lengths must be employed. Even though the light is that which comprises principally wave lengths longer than 350 m$\mu$, preferably longer than 400 m$\mu$, if there happens to be any contained shorter than these wave lengths, the achievement of the objects of the invention is hindered considerably, and in extreme cases the attainment thereof may be entirely impossible. Hence, it is particularly desirable to employ substantially no light having wave lengths shorter than 400 m$\mu$ in order to obtain with regularity over an extended period of time the hydrochloride salts of cycloalkanone oximes of high purity in high yield by means of a photonitrosation reaction which is stable.

The photonitrosation reaction of the present invention concerns a method of preparing the hydrochloride salts of cycloalkanone oximes by means of the photochemical reaction which comprises irradiating with light of the aforesaid wave length range cycloalkanes in the state in which a nitrosation agent has been dissolved therein or while continuously feeding the same. As the aforesaid nitrosation agent included are the mixed gas of a nitrosyl halide and a hydrogen halide, or a mixed gas of a halogen, nitrogen monoxide and a hydrogen halide, or a mixed gas of nitrose gas and a hydrogen halide, and as said halogen, chlorine is generally used. Particularly, the mixed gas of nitrosyl chloride and hydrogen chloride, the mixed gas of nitrosyl chloride, nitrogen monoxide and chlorine, or the mixed gas of nitrogen monoxide, nitrogen peroxide and hydrogen chloride is generally used.

In this operation, if the partial pressure of the nitrosyl chloride in the mixed gas is too low, the reaction does not take place sufficiently, while, on the other hand, if it is too high there is the tendency to the occurrence of side reactions. Hence, it is desired that the partial pressure of the nitrosyl chloride be 5–80 mm. Hg, preferably about 20–60 mm. Hg. Therefore, the photonitrosation reaction is preferably carried out in the presence of hydrogen chloride in an amount, based on the nitrosation agent, that is in excess of its equivalent, preferably 7 to 100 times its equivalent. On the other hand, the reaction temperature may be 0–50° C., but inasmuch as this reaction is an exothermic reaction, in consideration of such as the matter of its cooling and that side reactions other than the photoreaction might be set up, a temperature of from 0° to 20° C. to be especially desired.

As the cycloalkanes, those containing 5 to 14 carbon atoms can be used. Included as such cycloalkanes are, for example, cyclopentane, cyclohexane, cycloheptane, cyclooctane, cyclononane, cyclodecane, cycloundecane, cyclododecane, cyclotridecane, cyclotetradecane, etc.

Next, the procedures for positively removing light having the undesirable wave lengths according to the present invention will be described in further detail. In order to obtain light that does not have wave lengths shorter than 350 m$\mu$, preferably shorter than 400 m$\mu$, in this invention, it is advantageous commercially in preparing the hydrochloride salts of cycloalkanone oximes by nitrosating cycloalkanes with a nitrosation agent while irradiating with a light in the presence of hydrogen chloride to provide between the light source and the reaction system an absorption zone which substantially absorbs light having wave lengths shorter than 350 m$\mu$, preferably shorter than 400 m$\mu$, which are emitted from said light source. Needless to say, simple light having wave lengths which do not fall in the range shorter than 350 m$\mu$, preferably in the range not shorter than 400 m$\mu$, or a composite light of these wave lengths may also be used.

Included as such an absorption zone are, for example, such as the methods of employing (a) a fluorescent substance, (b) titanium oxide, (c) an ultraviolet ray filter glass and (d) nitrous acid or a water-soluble metallic salt of nitrous acid. It goes without saying that these methods may be employed singly or in suitable combinations. In short, in order to achieve the objects of the method of this invention, it suffices to positively eliminate light having wave lengths shorter than 350 m$\mu$, preferably shorter than 400 m$\mu$, that are contained in the light source, and ensure that light of these wave lengths that should be eliminated substantially do not reach the photonitrosation reaction system.

The foregoing methods (a)–(d) of eliminating these undesirable wave lengths will be described in further detail hereinafter.

(a) In the case a fluorescent substance is employed in the absorption zone, it is generally of advantage to add and dissolve a water-soluble fluorescent substance to the cooling water that is flowed such as to surround the light source for eliminating the undesirable heat rays of the light source. It is of course possible to not follow the above method of adding the fluorescent substance to the cooling water, but to construct either the wall, usually of glass, separating the jacket for the cooling water from the reaction system or the glass wall separating the light source from the cooling water that surrounds it is a double wall and fill this with a solution of the fluorescent substance, the cooling water being circulated separately. Alternatively, the fluorescent substance may be brushed on the glass wall, over which brushed-on fluorescent substance may be applied additionally a protective coating. Thus, in this manner, light having wave lengths shorter than 350 m$\mu$, preferably shorter than 400 m$\mu$, can be prevented from reaching the reaction system according to the method of this invention. In this instance, due to the fact that the fluorescent substance absorbs the light that needs to be positively eliminated in the method of this invention and the luminous energy possessed by this light having the undesirable wave lengths is converted as fluorescence into visible light, there are the advantages that the luminous energy possessed by the light whose wave lengths have been eliminated also becomes positively useful in the reaction system and also that this elimination of the light having undesirable wave lengths can be carried out critically. However, since there is a tendency that the fluorescent substance gradually deteriorates with the continuance of the reaction over extended period of time, it is preferred that the fluorescent substance be employed in solution form so as to enable it to be cycled and changed.

As such a fluorescent substance, included are all of the water-soluble and water-insoluble fluorescent substances such as, for example:

Kayaphor AS (Nihon Kayaku K.K.),
Whitex RP (Sumitomo Kagaku Kogyo K.K.),
Hakkol PN (Showa Kagaku Kogyo K.K.),
Hakkol BB conc (Showa Kagaku Kogyo K.K.),
Kakkol 4B conc (Showa Kagaku Kogyo K.K.),
Sodium $\beta$-naphthol,
Sodium $\alpha$-anthracenesulphonate,
Anthracene and the derivatives thereof,
Naphthalene and the derivatives thereof, etc.

Although these fluorescent substances may be used either singly or in combinations of two or more, those which do not deteriorate even by means of irradiation by light should be selected. In addition, as such fluorescent substances those which absorb luminous energy and emit, as fluoresence, light having wave lengths shorter than 350 m$\mu$ should be avoided, it being still more preferable if the use of those shorter than 400 m$\mu$ can be avoided. Again, it is possible to control the wave lengths to be absorbed by suitably selecting the fluorescent substance with respect to its kind, the concentration of its use, etc.

(b) When titanium oxide is employed for the absorption zone, it can be brushed on to the glass walls and this brushed on titanium oxide can then be protected by imparting to it a resin film or a glass coating which possesses good resistance to light, or by other means. As titanium oxide does not deteriorate as compared with the hereinbefore described fluorescent substances during extended periods of operation, it can be employed conveniently on the outer covering of the light source or on the inner or outer side of glass walls. Again, it is also used with advantage with the ultraviolet ray filter glass which is mentioned in the following section (c). Depending upon its crystalline form, titanium oxide is either rutile or anatase, both of which or the mixture thereof may be used. When either of the foregoing is to be employed alone, while rutile is desirable from the point of its light ray absorption characteristic, on the other hand, in the case of the combined use with other means anatase alone can also be conveniently utilized.

(c) When an ultraviolet ray filter glass is to be utilized for the absorption zone, the walls described in section (a), above, may be made of ultraviolet ray filter glass; or a sheet of an ultraviolet ray filter glass may be provided separately in an optional location between the light source and the reaction system. It is usually convenient to provide this separately in the cooling water between the outer covering of the light source, which separates the light source from the cooling water, and the glass wall, which separates the cooling water from the reaction system.

The ultraviolet ray filter glass that is used include those generally known glasses which absorb light of wave lengths shorter than 350 m$\mu$, preferably shorter than 400 m$\mu$ such as, for example, lead glass, cerium oxide containing-glass (e.g. Crookes glass) and lead-didymium glass. The type, thickness and numbers of these ultraviolet ray filter glasses are capable of various modifications. The use of ultraviolet ray filter glass has such advantages as that it can be used for a very long period of time, that it is simple from the points of view of its designing as well as its operation, etc. However there is likelihood that, especially in the case of an ultraviolet ray filter glass which does not deteriorate semipermanently, its cost would be high. Further, needless to say, the ultraviolet ray filter should preferably be those whose transmittance of light of wave lengths longer than 350 m$\mu$, preferably longer than 400 m$\mu$, is good.

(d) When nitrous acid and/or the water-soluble metallic salts of nitrous acid are to be utilized, as the presence of the nitrous acid ion is of particular importance, a method of use which hinders the dissociation of nitrous acid and/or the water-soluble metallic salts of nitrous acid must not be employed. But so long as the dissociation of the nitrous acid ion is not hindered and light of wave lengths longer than 350 m$\mu$, preferably longer than 400 m$\mu$, are not substantially absorbed, other ions may be copresent. Although the nitrous acid ions, after absorbing the light of short wave length, are in part, though the amount is slight, converted to nitric acid ions, the copresence of such nitric acid ions will not constitute a hindrance in the employment of nitrous acid and/or the water-soluble metallic salts of nitrous acid.

Although the tendency to degradation by means of irradiation with an intense light is unavoidable when a fluorescent substance is employed so that some become discolored and impede the transmittance of effective light, in the case of nitrous acid and/or the water-soluble salts thereof practically no degradation or change in quality occurs. In addition, it is also possible to recover and reuse the cooling water in which is dissolved nitrous acid and the salts thereof. Moreover, not only is it exceedingly advantageous for employment on a commercial scale in view of the ease with which it is available, but also light not containing wave lengths shorter than 350 m$\mu$, preferably not shorter than 400 m$\mu$, are almost completely transmitted so that the efficiency of the reaction is not lowered. Additionally, as the discoloration of the water due to the fur formation that occurs generally when the cooling water for the light source is circulated and used is almost completely prevented by the addition of nitrites, it is very favorable from the standpoint of the use of the cooling water by circulation of the same.

The nitrous acid and/or the water-soluble metallic salts of nitrous acid are conveniently added and dissolved in the cooling water for the light source which normally is flowed surrounding the light source to remove the undesirable heat rays emitted therefrom. Needless to say, it need not be added particularly to the cooling water, since it is permissible to construct the usual glass wall which separates the water jacket surrounding the light source from the reaction system or the glass wall which separates the light source from the cooling water on the outside thereof as a double wall and fill this with an aqueous solution of nitrous acid and/or the water-soluble salts thereof, the cooling water being separately circulated.

In this manner, the heat rays harmful to the reaction which are irradiated from the light source are removed and further the formation of a coating of a viscous, tar-like substance on the walls is prevented by the elimination of the ultraviolet rays which promote side reactions, whereby hydrochloride salts of cycloalkanone oximes of high quality are obtained in high yield.

As the water-soluble metallic salts of nitrous acid which are employed in the foregoing method, any of such salts may be used as long as they form nitrous acid ions as an aqueous solution, but it is of course preferred that it be those which do not discolor the aqueous solution. As such salts, included are, for example, such as sodium nitrite, potassium nitrite, barium nitrite, ammonium nitrite, etc. That which imparts color such as cobaltnitrite is undesirable. The objects of the invention are fully attained by the use of the aqueous solution of nitrous acid or nitrites as a solution of no more than about 2% by weight concentration.

Although we have illustrated hereinabove several methods of providing an absorption zone for obtaining light which does not have lengths shorter than 350 m$\mu$, preferably not shorter than 400 m$\mu$, it is to be understood that these methods are, as required, capable of various modifications in being employed singly or in suitable combinations and hence the invention is not to be limited necessarily to the foregoing methods. Further, as to whether or not the light having wave lengths that should be excluded has substantially been eliminated completely by means of the absorption zone can readily be determinable by the spectrum of the light transmitted through the absorption zone and hence it is possible, by means of such a spectrum, to select the absorption zone by making suitable modifications or combinations as necessary.

*Example 1*

Figure 9:
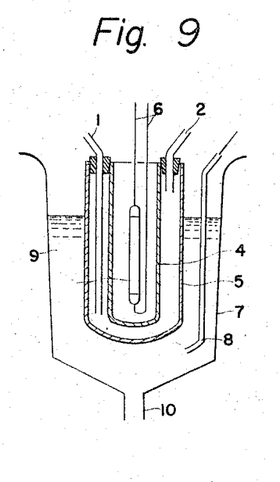

A cylindrical pyrex glass reactor 7, 9.5 cm. inside diameter and 26 cm. high equipped with a valved discharge outlet 10 at its bottom, as shown in section in FIG. 9 of the accompanying drawings, was charged with 1 liter of cyclohexane, and into this was immersed as the light source a 200 w. rod-shaped, high pressure mercury-vapor lamp 3 having a glass jacket 4, 5 for the cooling water. In the figure, 1 is the inlet for the cooling water and 2, the outlet for the cooling water, and the foregoing jacket for the cooling water consists of pyrex glass cylinders 4 and 5. 6 is the lead wire of the mercury-vapor lamp, 8, the blowing-in pipe for the gas, and 9, the reaction liquid.

After adding 0.33% by weight of nitrous acid to the cooling water for the light source and cooling it to 10° C., it was employed as the absorption zone by passing it through the inside of the aforesaid cooling jacket. Under these conditions, the light of wave lengths shorter than 400 m$\mu$ were completely absorbed at the cooling jacket. While passing the cooling water through the jacket at the rate of 100 cc. per minute, the mercury-vapor lamp was switched on, the temperature of the reaction liquid maintained at 12° C., nitrosyl chloride and hydrogen chloride were mixed in the proportion of 120 cc. per minute for the former and 480 cc. per minute for the latter, and this mixed gas was blown into the reaction liquid 9 from the bottom of reactor 7 by means of gas blowing-in pipe 8. In this manner, the reaction was carried out for 4 hours whereby was obtained 79.5 grams of an oil-like product. This was dissolved in a small amount of water and then by neutralizing with 20% caustic soda 44.1 grams of cyclohexanone oxime was obtained. After completion of the reaction, no formation at all was observed of a yellowish brown coating on the surface of the glass in contact with the reaction liquid. In contrast, when the reaction was carried out without adding nitrous acid to the cooling water, 78.0 grams of the oil-like product and 40.5 grams of oxime were obtained, and on the surface of the jacket after the reactions brown coating had formed on all of that part where the light was transmitted.

*Example 2*

Employing the same apparatus as in Example 1 and by means of the same procedures and conditions, potassium nitrite was added to the cooling water for the mercury-vapor lamp so that its concentration would become 0.62% by weight. The reaction was then carried out by using cyclooctane instead of cyclohexane whereby was obtained 63.9 grams of cyclooctanone oxime. Further, no formation of a colored coating on the surface of the cooling jacket for the mercury-vapor lamp was observed.

On the other hand, when no additions were made to the cooling water for the mercury-vapor lamp under identical conditions, 58.9 grams of cyclooctanone oxime was obtained and a coating of dark brown color was formed on the glass surface.

*Example 3*

Figure 10:
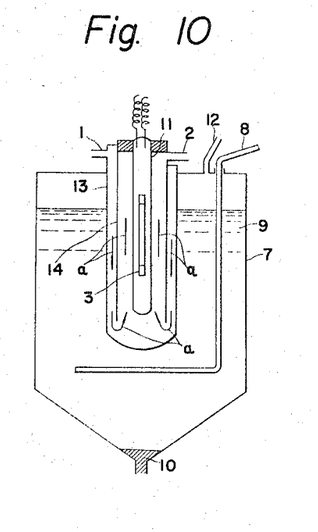

A titanium reaction vessel 7 of the type shown in FIG. 10 was charged with 270 liters of cyclohexane, and a 10 kw. high pressure mercury-vapor lamp 3 equipped with a protective tube 11 was inserted as the light source.

While maintaining the reaction liquid 9 at 10° C. by cooling the surroundings of the reaction vessel 7, a mixed gas of nitrosyl chloride and hydrogen chloride in a mole ratio of 1:19 was blown into the reaction liquid 9 from the gas blowing-in tube 8 at the rate of 180 liters per minute.

Cyclohexane consumed by the reaction was replenished to the reaction liquid 9 from inlet 12, and the oil-like hydrochloride salt of cyclohexanone oxime was obtained from the bottom 10.

In this case, 5° C. water to which had been added sodium nitrite so as to become 0.5% was introduced from a cooling water inlet 1 into an outer cooling water packet 13, made to flow along a baffle tube 14, as indicated by arrow *a* in the figure, and then taken out to the outside from a cooling water outlet 2.

By doing thus, light of wave lengths shorter than 380 m$\mu$ is completely absorbed by the cooling water zone. In consequence of having carried out the reaction in this manner, the amount formed of an oil-like hydrochloride salt of cyclohexanone oxime for each hour period over an extended period of 89 hours was practically constant. The average quantity formed of the hydrochloride salt of cyclohexanone oxime was 2.93 kg. per hour, and as a result of analysis the oxime obtained per hour was 1.67 kg.

Further, the oil-like hydrochloride salt of cyclohexanone oxime obtained was, in its as-obtained state, effected the Beckmann rearrangement with concentrated sulfuric acid, and the so obtained mixed solution of $\epsilon$-caprolactam and sulfuric acid was neutralized with ammonia water. An aqueous solution of crude lactam was separated from this neutralized liquid, and this was concentrated under reduced pressure followed by addition of 0.2% by weight of caustic soda and effecting of distillation under a reduced pressure of 5–10 mm. Hg. When the permanganate value (PMV) of the so obtained lactam was measured, it was 340 seconds. PMV, as herein used, represents the time that it takes for a given amount of potassium permanganate which is added to lactam to be reduced by the reductant contained therein and fade. Hence, the shorter this time, the inferiority of the quality of the lactam as a polymerization starting material is indicated. On the other hand, when the experiment was carried out by similar procedures and under the same conditions, except that sodium nitrite was not added to the cooling water, the number of hours that it was possible to operate stably until a decline in the amount formed occurred was 12 hours. The quantity of oxime formed during this time was 164 grams per unit of electric power. Further, the PMV of the lactam obtained from this oxime by the foregoing treatment was 60 seconds.

*Example 4*

Except that sodium nitrite was added and dissolved in the cooling water so as to become 2.0% by weight thereof, otherwise this example was carried out as in Example 3, whereby light of wave lengths shorter than 400 m$\mu$ was completely absorbed by the cooling water zone.

This cooling water to which had been added sodium nitrite, while being cooled with a cooler was repeatedly employed as the cooling water of the light source for a period of 3000 hours. Even after use for 3000 hours, hardly any deterioration occurred in the sodium nitrite added, nor was there any change at all in the effects as intended by this invention.

*Example 5*

When the photonitrosation reaction of cyclohexane was carried out employing the same apparatus as in Example 8 and under the same conditions, for the protective tube of the 10 kw. mercury-vapor lamp, the baffle tube, and the outer tube for the cooling water coming in direct contact with the photoreaction zone a glass which would transmit more than 95% of light having wave lengths between 300 m$\mu$ and 1 m$\mu$ was used. Then to the cooling water were added and dissolved therein sodium nitrite and sodium nitrate in the amounts of 0.5% by weight and 1.0% by weight, respectively. By doing thus, light of wave lengths shorter than 400 m$\mu$ was completely absorbed by the cooling water.

When the reaction was carried out after doing as above, the amount formed of the hydrochloride salt of cycloalkylanone oxime for each hour over a 92-hour period was practically constant.

The formation of the hydrochloride salt of cyclohexanone oxime averaged 2.91 kg. per hour, and oxime was obtained at the rate of 1.66 kg. per hour.

Furthermore, when the Beckmann rearrangement of the as-obtained oil-like hydrochloride salt of cyclohexanone oxime was effected by means of sulfuric acid, the quality of the $\epsilon$-caprolactam so obtained was particularly excellent.

For purpose of comparison, the reaction was carried out with the same procedures and conditions, except that only sodium nitrite was added to the cooling water. In this case, a little of light in the neighborhood of 300 m$\mu$ was transmitted. After a reaction time of about 32 hours, the amount formed of the oxime fell, and thereafter the reaction could not be carried on stably. The hydrochloride salt of cycloalkanone oxime obtained averaged 2.89 kg. per hour, of which the cycloalkanone oxime averaged 1.65 kg. per hour. The quality of the $\epsilon$-caprolactam obtained from this product by means of the Beckmann rearrangement, containing some impurities, was somewhat inferior to that obtained by employing sodium nitrate together with the sodium nitrite.

*Example 6*

Figure 11:
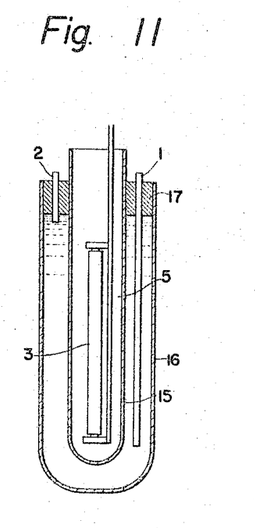

In this example, an ultraviolet ray filter glass was used. As shown in FIG. 11, the double-wall jacket made of glass, which is to be used as the filter glass, consists of a cooling water inlet 1, a cooling water outlet 2, cylinders 15 and 16 made of lead glass, and packing 17. A cylindrical glass reactor (not shown) 9.5 cm. inside diameter and 26 cm. high equipped with a valved outlet at the bottom was charged with about 1 liter of cyclooctane. Into this reactor was immersed a double-wall jacket made of lead glass of a construction, as illustrated, through which flows cooling water for cooling the light source which comprises a 200 w. rod-shaped, high pressure mercury-vapor lamp inserted in the inside of said packet. By means of this apparatus the ultraviolet rays of wavelengths shorter than 360 mµ emitted from the light source are substantially not transmitted to the photoreaction zone. The mercury-vapor lamp was turned on and while maintaining the temperature of the reaction liquid by means of cooling from the outside, a mixed gas in the proportion of 120 cc./min. of nitrosyl chloride and 1200 cc./min. of hydrogen chloride was blown in from the bottom of the reaction liquid. The color of the reaction liquid changed from colorless to light yellow, and about 10 minutes later a light yellow, oil-like substance was separated and came out at the valved outlet at the bottom of the reactor. In this manner, with a reaction time of 4 hours there was obtained 105.7 grams of an oil-like product. This was dissolved in a small amount of water and then neutralized to pH 6 with 20% caustic soda whereby was obtained 70.5 grams of cyclooctanone oxime having a melting point of 35–36° C. Even after completion of the reaction, no formation at all of a colored coating on the surface of the cooling jacket in contact with the reaction liquid could be observed.

On the other hand, when a similarly constructed double-wall jacket of ordinary hard glass was substituted and the reaction was carried out in a similar manner, 94.4 grams of the oil-like product was obtained, from which 63.8 grams of the oxime was obtained, and on the surface of the cooling jacket was formed a brown coating on the whole of that portion where the light passed through.

*Example 7*

Figure 12:
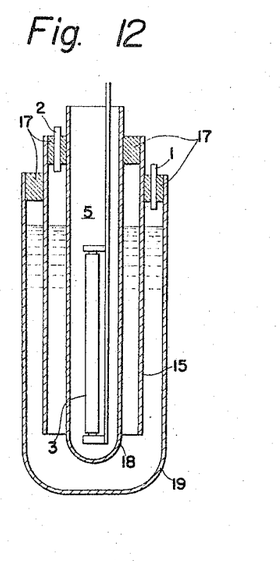

To a reactor, as employed in Example 6, was charged about 1 liter of cyclohexane, and in this was immersed a triple-wall tube having, as shown in FIG. 12, an inlet for cooling water 1, an outlet for cooling water 2, an inner tube of ordinary hard glass 18, an intermediate tube 15, an outer tube of ordinary hard glass 19, and packings 17, and in which inside had been inserted a 200 w. high pressure mercury-vapor lamp. Then the reaction was carried out by blowing into the bottom of the reaction liquid a gas mixed in the proportions of 100 cc./min. of nitrosyl chloride and 2 l./m. of hydrogen chloride, while the reaction liquid was maintained at 1° C. by cooling from the outside and the portion consumed of the cyclohexane was replenished. This reaction was carried out on one hand by employing an ordinary hard glass as the intermediate tube 15 and, on the other, by employing for this an ultraviolet ray filter glass containing cerium oxide (which absorbs completely light of wave lengths shorter than 370 mµ). In the following table are shown the results of this comparative experiment. As is apparent from these results, although there can be observed no change at all in the yield even after 20 hours when the ultraviolet ray filter glass containing cerium oxide has been employed, on the other hand, when ordinary hard glass was employed, it was necessary to interrupt the reaction every 4–6 hours and clean the glass.

| | Oxime Yield When Ordinary Hard Glass Used (g.) | Oxime Yield When Cerium Oxide-Containing Glass Used (g.) |
|---|---|---|
| Up to 2nd hour after start of reaction | 24.0 | 22.2 |
| From 2nd hour to 4th hour | 22.8 | 23.1 |
| From 4th hour to 6th hour | 20.5 | 23.4 |
| From 6th hour to 8th hour | 18.5 | 23.0 |
| From 8th hour to 10th hour | 17.4 | 22.9 |
| From 10th hour to 12th hour | 15.0 | 22.5 |
| From 12th hour to 14th hour | 15.1 | 23.0 |
| From 14th hour to 16th hour | 13.2 | 22.7 |
| From 16th hour to 18th hour | 11.0 | 23.3 |
| From 18th hour to 20th hour | 11.5 | 23.0 |

*Example 8*

A cylindrical glass reactor 9.5 cm. inside diameter and 26 cm. high equipped at its bottom with a valved outlet was charged with about 1 liter of cyclohexane. In this was immersed a glass tube provided with a cooling water jacket whose liquid zone is 10 mm. thick and the end of which tube is open wherein is inserted a 200 w. rod-shaped, high pressure mercury-vapor lamp. As the fluorescent agent in the cooling water of the light source, that comprising Whitex RP (trade name) which had been added at the rate of 0.5 gram per liter of water was used by passing it through the cooling jacket of the light source after having been cooled to 10° C. Under these conditions, light of shorter wave length than 400 mµ emitted from the light source was completely absorbed at the cooling jacket and was converted as fluorescence to visible light. While passing the cooling water through the jacket at the rate of 100 cc. per minute and effecting irradiation with the mercury vapor lamp, a mixed gas in the proportion of 120 cc./min. of nitrosyl chloride and 480 cc./min. of hydrogen chloride was blown into the bottom of the reaction liquid which maintaining temperature thereof at 12° C. The reaction liquid changed from colorless to light yellow, and about 10 minutes later a light yellow, oil-like substance separated and came out at the valved outlet at the bottom of the reactor. In this manner, 92.0 grams of an oil-like substance was obtained with a reaction time of 4 hours. This was disclosed in a small amount of water and neutralized to pH 5.4 with 20% caustic soda whereby was obtained 63.4 grams of cyclohexanone oxime having a melting point of 88–89° C. Even after the completion of the reaction, no formation at all of a colored coating could be observed on the surface of the glass cooling jacket in contact with the reaction liquid.

On the other hand, when the reaction was carried out in a similar manner employing only water at 10° C. for removing the heat rays of the mercury vapor lamp, the yield of the oil-like product was 78.0 grams and that of oxime was 40.5 grams, and after the reaction there was formed a brown coating on the whole of that portion of the cooling jacket surface where the light had passed through.

*Example 9*

Employing a similar apparatus as in Example 8 and blowing into the reaction liquid a mixed gas in the proportion of 100 cc./min. of nitrosyl chloride and 2 liters/min. of hydrogen chloride, the reaction was carried out, on one hand, by using as the cooling water for the mercury vapor lamp that comprising Whitex RP dissolved in water in the proportion of 0.5 gram of the former to 1 liter of the latter, and then cooled to 10° C.; and on the other hand, by using only 10° C. water for cooling the lamp. The comparative results of this experiment are as shown in the following table. As is apparent from these results, when the fluorescent agent was added, there could be observed practically no change in the yield even after 20 hours. On the other hand, when Whitex RP was not added, the reaction had to be interrupted every 4–6 hours to clean the glass.

| | Yield of Oxime when Whitex RP added (g.) | Yield of Oxime when not added (g.) |
|---|---|---|
| Up to 2nd hour after start of reaction | 21.5 | 23.5 |
| From 2nd hour to 4th hour | 23.6 | 21.5 |
| From 4th hour to 6th hour | 23.9 | 18.7 |
| From 6th hour to 8th hour | 22.8 | 16.1 |
| From 8th hour to 10th hour | 23.1 | 14.9 |
| From 10th hour to 12th hour | 22.6 | 12.1 |
| From 12th hour to 14th hour | 22.9 | 12.5 |
| From 14th hour to 16th hour | 23.3 | 11.3 |
| From 16th hour to 18th hour | 22.5 | 11.0 |
| From 18th hour to 20th hour | 22.1 | 9.5 |

Example 10

When the reaction was carried out employing the same apparatus as in Example 8 and by same procedures, except that sodium α-anthracenesulfonate was added to the mercury vapor cooling water such that its concentration became 0.5 gram/liter and cyclooctane was rised instead of cyclohexane, the yield of the oil-like product was 95.7 grams, which when neutralized gave 64.7 grams of cyclooctanone oxime. Again, the formation of a colored coating on the surface of cooling jacket of the mercury vapor lamp was not observed.

On the other hand, when the reaction was carried out under identical conditions using only water for cooling the mercury vapor lamp, the yield of the oil-like product was 87.4 grams, which upon neutralization gave 58.7 grams of cyclooctanone oxime. Moreover, formation of a dark brown coating was observed on the whole of the cooling jacket through which the light passed.

Example 11

A metallic titanium photoreaction tank of 9 m.$^3$ capacity and so adapted as to permit fifteen 20 kw. high pressure mercury-vapor lamps to be arranged with suitable spacing and to be immersed in the reaction liquid was charged with the prescribed amount of cyclohexane. The temperature of the cyclohexane was regulated to 18° C. by cooling from the outside periphery of the tank with a coolant. Using as the nitrosation agent a mixed gas of nitrosyl chloride and hydrogen chloride (nitrosyl chloride to hydrogen chloride mole ratio of 5:95), this was blown in by means of a gas blowing in pipe from the bottom of the reaction tank into the cyclohexane at the rate of 6 m.$^3$ per minute. The high pressure mercury-vapor lamp 3 had a protective tube 11 and a cooling water jacket, such as shown in FIG. 10, and was cooled from its outer periphery by water cooled to 10° C. In this instance, the rate at which the cooling water flows was adjusted so that its temperature at the discharge point would become 50° C.

When the mercury-vapor lamp was turned on and the mixed gas of nitrosyl chloride and hydrogen chloride was blown in, the photonitrosation reaction proceeded whereby was formed an oil-like cyclohexanone oxime hydrochloride. Since this product was heavier than cyclohexane and moreover insoluble in cyclohexane, it accumulated at the bottom of the reaction tank, from whence it was drawn off via the liquid outlet. The cyclohexane consumed by the reaction was replenished by feeding from an inlet for cyclohexane provided at the top of the tank, hence maintaining the liquid level of the reaction liquid uniform at all times throughout the reaction.

As the cooling water of the herein-described mercury-vapor lamp, water in which had been disclosed 0.7% by weight of barium nitrite was used. This was for absorbing substantially completely light of wave lengths shorter than 400 m$\mu$ so as to prevent their irradiating of the reaction system. Incidentally, ultraviolet rays of shorter than 300 m$\mu$ do not pass through ordinary hard glass.

When the photonitrosation reaction of cyclohexane was performed in this manner, the amount formed of oxime for each hour over about 100 hours remained substantially unchanged. And the amount formed of oxime with respect to the electric power used for the light source averaged 187 grams per kwh. Furthermore, the quality of the hydrochloride salt of oxime formed was good, it being possible to obtain ε-caprolactam of such quality as to be full sufficient for polyamide, i.e., that having a PMV of 480 seconds, simply by effecting the Beckmann rearrangement of the hydrochloride salt of oxime directly with a concentrated sulfuric acid to obtain ε-caprolactam, neutralizing the sulfuric acid and separating the lactam, concentrating the resulting crude lactam, and effecting simple distillation once after adding caustic soda in an amount of 0.2% based on the amount of lactam charged.

On the other hand, when ordinary water was used as the cooling water for the mercury-vapor lamp, it was necessary to clean the tar-like formation on the surface of cooling water jacket with sulfuric acid once every 24 hours. In addition, the amount formed of oxime averaged 175 grams per kwh. and the PMV of the ε-caprolactam obtained by treating the oxime obtained in a similar manner as above, was 72 seconds. Thus, it is apparent that there was a deterioration in the quality.

Example 12

The reaction apparatus of the same type as in Example 8 was employed, except that instead of the high pressure mercury-vapor lamp 300 w. xenon lamp was used, and the rutile form of titanium oxide was applied thinly to the innermost part of the double-wall tube for cooling the light source. In this example whose condition is that water is used for cooling the light source, ultraviolet rays of wave lengths shorter than 350 m$\mu$ were almost completely absorbed by the titanium oxide and were not transmitted to the reaction system. As regards light of 365 m$\mu$, about 10% thereof that was emitted from the light source was transmitted. When the nitrosation reaction was carried out as in Example 8 by using cyclopentane and under a reaction temperature condition of 5° C. blowing in nitrosyl chloride at 120 cc./min. and hydrogen chloride at 1200 cc./min., with a reaction time of 10 hours 115.7 grams of cyclopentanone oxime was obtained. And after the reaction there was observed hardly any formation of a yellowish brown coating on the surface of the cooling jacket in contact with the reaction liquid.

Example 13

A titanium reaction tank 7 of the type illustrated in FIG. 10 was charged with 200 liters of a mixed liquid containing cyclohexane and cyclododecane in a ratio of 2:1 by weight, and a 2 kw. xenon lamp 3 equipped with a protective tube 11 was inserted as the light source.

While maintaining the reaction liquid 9 at 0° C. by cooling the surroundings of the reaction tank 7, a mixed gas of nitrosyl chloride and hydrogen chloride in a mole ratio of 1:8 was blown into the reaction liquid 9 from a gas blowing in pipe 8 at the rate of 12 liters per minute. Meanwhile, water of 0° C. was introduced from inlet of cooling water 1, flowed as shown by the arrow in the figure in accordance with baffle tube 14 and removed to the outside from outlet for the cooling water 2.

The mixed liquid of cyclohexane and cyclododecane consumed by the reaction was replenished to the reaction liquid 9 from the inlet 12, and the resultant oil-like mixture of the hydrochloride salt of cyclododecanone oxime and the hydrochloride salt of cyclododecane oxime was obtained from the outlet 10.

In this case, by using for the cooling water jacket Corning #051 light of wave length shorter than 370 m$\mu$ were almost all absorbed and eliminated.

As a result of having carried out the reaction in this manner, the amount formed of the oil-like mixture of the hydrochloride salt of cyclododecanone oxime and the hydrochloride salt of cyclododecane oxime for each hour over a period of 61 hours was practically constant. The amount of the mixture of the hydrochloride salt of cyclohexanone oxime and the hydrochloride salt of cyclododecanone oxime formed averaged 499 grams per hour, which analyzed 166 grams per hour of cyclododecanone oxime and 145 grams per hour of cyclodecane oxime.

Furthermore, when the Beckmann rearrangement of the mixture of the hydrochloride salts of the two oximes was effected by means of sulfuric acid and separation was effected, ε-caprolactam and ω-caprolactam were obtained. When simple distillation of this was effected once, the PMV of the ε-caprolactam was 325 seconds, and when this was recrystallized once the PMV of the ω-laurinlactam was 403 seconds.

On the other hand, when the reaction was carried out emyloying the same procedures and under the same conditions, except that ordinarily hard glass was used for the cooling jacket 13, the time that it was possible to stably carry out the reaction until a decline in the amount formed took place was 8 hours. And the average amount formed of the mixture of the hydrochloride salts of the two oximes was 475 grams per hour, which analyzed 155 grams per hour of cyclohexanone oxime and 135 grams per hour of cyclododecanone oxime. Further, the ε-caprolactam obtained by effecting said treatment of this product had a PMV of 46 seconds; and the PMV of the ω-laurinlactam was 61 seconds.

*Example 14*

A 3 m.$^3$ capacity photoreaction tank lined with hard vinyl chloride and so adapted that six 10 kw. high pressure mercury-vapor lamps are arranged therein with suitable spacing and that they can be immersed in the reaction liquid was charged with 3 cubic meters of cyclohexane. The cyclohexane was cooled by a coolant flowing through a coil of pipe provided in the reaction tank and so maintained at 20° C. As the nitrosation agent, a mixed gas of nitrosyl chloride and hydrogen chloride (hydrogen chloride to nitrosyl chloride mole ratio of 12:1) was used, which was blown in by means of a gas blowing-in pipe from the bottom of the reaction tank into the cyclohexane at the rate of 900 liters per minute.

When the mercury-vapor lamp was turned on and the mixed gas of nitrosyl chloride and hydrogen chloride blown into the cyclohexane, an oil-like cyclohexanone oxime hydrochloride was formed by means of the photonitrosation reactions, which was drawn off from the bottom of the reaction tank. The cyclohexane consumed by the reaction was continuously fed from the inlet for charging the cyclohexane to thereby maintain the liquid level in the reaction tank uniformly at all times.

The high pressure mercury-vapor lamp used in this case was provided with a protective tube whose inner surface had been thinly coated with a fluorescent pigment. And for the baffle tube 14 for the cooling water, as was shown in FIG. 10 referred to in Example 3, a filter glass was used which would absorb substantially all of the violet rays of less than 400 mμ but transmit practically all of the light of 405 mμ emitted from the mercury-vapor lamp. The cooling water was ordinary water cooled to 10° C., which was flowed at the rate of 250 liters per hour for each mercury-vapor lamp, the method of flowing the cooling water being as shown in FIG. 10 referred to in Example 3.

When the reaction was carried out in this manner, the amount of oxime formed per unit hour over a period of 90 hours was practically constant, the average yield of the oxime during this period being 191 grams per kw. But when a high pressure mercury-vapor lamp whose protective tube had not been coated with a fluorescent pigment was used, and further, for the baffle tube 14 ordinary hard glass was used, the amount formed on the oxime fell after 15 hours and the average oxime yield per unit electric power was 180 grams.

*Example 15*

Employing the same apparatus and the same procedure as in Example 8, but using instead of the high pressure mercury-vapor lamp a 200 w. thallium lamp (thallium iodide is sealed in place of mercury) and instead of cyclohexane, cyclopentane, the photonitrosation reaction was carried out by blowing in nitrosyl chloride at 120 cc./min. and hydrogen chloride at 600 cc./min. while maintaining a reaction temperature of 18° C. by passing as the cooling water through at the rate of 70 cc. per minute that comrising Hakkol PN (trade name) added at the rate of 0.3 gram to 1 liter of water followed by cooling to 13° C. Under these conditions, light of wave lengths shorter than 400 mμ was not transmitted to the reaction system. With a reaction time of 4 hours, 98.1 grams of an oil-like product was obtained, which, when neutralized gave 49.3 grams of cyclopentanone oxime. Moreover, the formation of a tar-like substance on the surface of the cooling jacket could not be observed.

On the other hand, when the same reaction was carried out using only water for cooling the light source without adding Hakkal PN, the yield of the oil-like product was 81.3 grams and that of the oxime was 41.5 grams. And on the surface of the cooling jacket formation of a large amount of brown to black tar-like substance occurred.

*Example 16*

Employing the same reaction tank as in Example 3, this was charged with 270 liters of cyclohexane. While maintaining a reaction temperature of 8° C., a mixed gas of nitrosyl chloride and hydrogen chloride (nitrosyl chloride to hydrogen chloride mole ratio of 1:12) was blown into the cyclohexane at the rate of 100 liters per minte as the nitrostating agent. The oil-like cyclohexanone oxime hydrochloride formed was drawn off from the bottom of the tank while the cyclohexane consumed is continuously replenished from the cyclohexane feeding pipe, thus maintaining the liquid level constant at all times.

Figure 13:
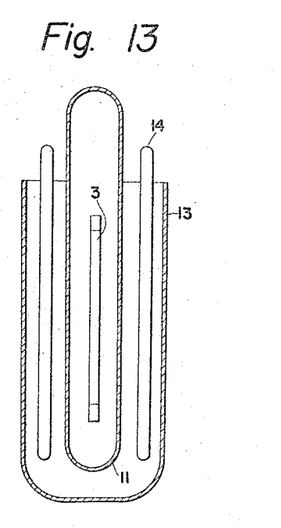

As the light source in this example, a 10 kw. high pressure mercury-vapor lamp was used, and the baffle tube 14, shown in FIG. 10 and referred to in Example 3, was constructed as a double-wall glass tube of hard glass, as shown in FIG. 13, in which was sealed a 0.7% by weight aqueous solution of sodium nitrite. This concentration was such that substantially all light of wave lengths shorter than 380 mμ were absorbed and eliminated while practically all light of 405 mμ emitted by the mercury-vapor lamp was transmitted.

In consequence of having carried out the reaction in this manner, the amount formed of the oxime for each hour was practically constant for 73 hours, after which it started to decline. The oxime yield per unit of electric power during this period averaged 167 grams.

On the other hand, when the reaction was carried out following the same procedures and under the same condition, except that ordinary water was sealed in the double-wall baffle tube, the number of hours that the reaction could be stably carried out was 6 hours, and the average yield of the oxime per unit electric power during this period was 152 grams.

*Example 17*

Employing the same apparatus and light source as shown in FIG. 10, the reaction was carried out following the same procedures as in Example 3. However, as the gas blown in, a mixed gas of nitrosyl chloride and hydrogen chloride in the mole ratio of 1:9 was fed to the reaction liquid at the rate of 90 liters per minute, while the reaction temperature was maintained at 8° C.

In this instance, 5° C. water to which had been added a fluorescent brightening agent Whitex RP (tradename of Sumitomo Kagaku Kogyo K.K. product) in an amount such as to become 0.05% concentration was employed as the cooling water. By doing thus, light of wave length shorter than 400 mμ was substantially all absorbed and eliminated by the cooling water layer.

As a result of having effected the reaction in this manner, the yield of the oil-like hydrochloride salt of cyclohexanone oxime for each hour was practically constant over an 84-hour period. The yield of the hydrochloride salt of cyclohexanone oxime averaged 2.75 kg., and upon analysis the oxime obtained was 1.68 kg. per hour.

Further, when cooling water in which the concentration of the fluorescent brightening agent was made 0.15% was employed, light of wave lengths shorter than 410 mμ was substantially all absorbed and eliminated by the cooling water layer. When the reaction was carried out under these conditions, the yield of the hydrochloride salt of cyclohexanone oxime for each hour averaged 2.80 kg. and was practically constant over a period of 97 hours. Upon analysis, the oxime obtained was 1.60 kg. per hours.

*Example 18*

A metallic titanium reactor of cyclindrical shape 25 cm. inside diameter and 30 cm. high equipped at its bottom with a valved outlet was charged with about 13 liters of cyclohexane. Then the reaction was carried out by immersion of the same type of cooling jacket, as shown in FIG. 12 and employed in Example 7, in which was inserted a 400 w. high pressure mercury-vapor lamp and by blowing into the bottom of the reaction liquid a gas mixed in the proportion of 400 cc./min. of nitrosyl chloride and 4 l./min. of hydrogen chloride, while maintaining the reaction liquid at 12° C., replenishing the amount consumed of the cyclohexane, and employing for the intermediate tube ordinary hard glass. And for purpose of comparison, the reaction was also carried out by using three kinds of ultraviolet ray filter glass $a$, $b$ and $c$ (see FIG. 7). The results are set forth in the following table.

|  | Oxime Yield When Ordinary Hard Glass Used (g.) | Oxime Yield When Ultraviolet Filter Glass $a$ Used (g.) | Oxime Yield When Ultraviolet Filter Glass $b$ Used (g.) | Oxime Yield When Ultraviolet Filter Glass $c$ Used (g.) |
|---|---|---|---|---|
| Up to 1st hour after start of reaction | 30.4 | 33.6 | 21.7 | 34.7 |
| From 1st hour to 2nd hour | 40.3 | 42.4 | 32.3 | 41.5 |
| From 2nd hour to 3rd hour | 39.8 | 45.4 | 34.2 | 43.2 |
| From 3rd hour to 4th hour | 35.5 | 46.7 | 37.3 | 45.5 |
| From 4th hour to 5th hour | 33.9 | 47.8 | 36.6 | 46.2 |
| From 5th hour to 6th hour | 29.9 | 48.0 | 36.6 | 46.2 |
| From 6th hour to 7th hour | 29.9 | 48.3 | 38.2 | 46.2 |
| From 7th hour to 8th hour | 25.3 | 47.5 | 37.6 | 45.3 |
| From 8th hour to 9th hour | 27.0 | 45.6 | 35.0 | 47.0 |
| From 9th hour to 10th hour | 21.6 | 47.9 | 38.4 | 43.5 |
| From 10th hour to 11th hour | 18.4 | 46.7 | 39.0 | 42.7 |
| From 11th hour to 12th hour | 19.7 | 44.5 | 35.2 | 39.5 |
| From 12th hour to 13th hour | 16.0 | 45.4 | 38.0 | 40.4 |
| From 13th hour to 14th hour | 13.8 | 46.8 | 35.3 | 37.6 |
| From 14th hour to 15th hour | 14.3 | 44.6 | 36.5 | 33.4 |
| From 15th hour to 16th hour | 10.1 | 46.6 | 35.8 | 33.3 |
| From 16th hour to 17th hour | 13.8 | 46.3 | 38.7 | 34.4 |
| From 17th hour to 18th hour | 9.4 | 45.5 | 36.8 | 31.2 |
| From 18th hour to 19th hour | 11.2 | 47.9 | 37.4 | 29.1 |
| From 19th hour to 20th hour | 12.0 | 47.3 | 37.4 | 29.1 |

As is apparent from these results, when the ultraviolet ray filter glasses $a$ and $b$ were used, there was observed no changes at all in the yield with the passage of time, whereas when the ordinary hard glass was used it was necessary to interrupt the reaction every 4–6 hours and clean the cooling jacket of the formation of a tar-like substance. Again, when the ultraviolet ray filter glass $c$ was used, it was seen that the time until cleaning was necessary was prolonged greatly as compared with the instance when ordinary hard glass was used. Therefore, it is obvious that the oxime forming ability also becomes greater when the ultraviolet ray filter glass is used.

What is claimed is:

1. A method of producing cycloalkanone oxime hydrochlorides photochemically which comprises effecting the nitrosation of a cycloalkane with a nitrosating agent while irradiating with light in the presence of hydrogen chloride in excess of its equivalent, based on the nitrosating agent, preferably from 7 to 100 times equivalent, providing between the light source and the reaction system a light absorption zone adapted to absorb substantially completely all light of a wavelength shorter than 400 millimicrons from the light emitted by said light source.

2. A method in accordance with claim 1 wherein a fluorescent substance is used as the light absorption zone.

3. A method in accordance with claim 1 wherein titanium oxide is used as the light absorption zone.

4. A method in accordance with claim 1 wherein an ultraviolet ray filter glass is used as the light absorption zone.

5. A method of producing cycloalkanone oxime hydrochlorides photochemically which comprises effecting the nitrosation of a cycloalkane with a nitrosating agent while irradiating with light in the presence of hydrogen chloride in excess of its equivalent, based on the nitrosating agent, preferably from 7 to 100 times equivalent, providing between the light source and the reaction system a light absorption zone adapted to absorb substantially completely all light of a wavelength shorter than 400 millimicrons from the light emitted by said light source, said light absorption zone being an aqueous solution of at least one compound selected from the group consisting of nitrous acid and the water-soluble metal salts thereof.

6. A method in accordance with claim 5 wherein said light absorptive compound is incorporated in cooling water surrounding said light source.

7. A method in accordance with claim 6 wherein said light absorptive compound is incorporated in said cooling water in an amount so as to become at most 2% by weight of the solution thereof.

References Cited by the Examiner

UNITED STATES PATENTS

| 2,885,332 | 5/1959 | Mueller et al. | 204—162 |
| 2,985,572 | 5/1961 | von Schickh et al. | 204—162 |
| 3,047,481 | 7/1962 | Kahr | 204—162 |
| 3,048,634 | 8/1962 | Mueller et al. | 204—162 |
| 3,090,739 | 5/1963 | Ito | 204—162 |

HOWARD S. WILLIAMS, *Primary Examiner.*

JOHN R. SPECK, *Examiner.*